US008489371B2

(12) United States Patent
Guillon et al.

(10) Patent No.: US 8,489,371 B2
(45) Date of Patent: Jul. 16, 2013

(54) METHOD AND DEVICE FOR DETERMINING TRANSFER FUNCTIONS OF THE HRTF TYPE

(75) Inventors: Pierre Guillon, Sautron (FR); Rozenn Nicol, La Roche Derrien (FR)

(73) Assignee: France Telecom, Paris (FR)

( * ) Notice: Subject to any disclaimer, the term of this patent is extended or adjusted under 35 U.S.C. 154(b) by 364 days.

(21) Appl. No.: 12/919,321

(22) PCT Filed: Feb. 17, 2009

(86) PCT No.: PCT/FR2009/050246
§ 371 (c)(1),
(2), (4) Date: Aug. 25, 2010

(87) PCT Pub. No.: WO2009/106783
PCT Pub. Date: Sep. 3, 2009

(65) Prior Publication Data
US 2011/0009771 A1 Jan. 13, 2011

(30) Foreign Application Priority Data
Feb. 29, 2008 (FR) ..................................... 08 51348

(51) Int. Cl.
*G06G 7/48* (2006.01)
*G06F 7/60* (2006.01)
*G06F 17/10* (2006.01)
*H04R 5/00* (2006.01)

(52) U.S. Cl.
USPC ..................................... 703/6; 703/2; 381/17

(58) Field of Classification Search
USPC ............................................ 703/2, 6; 381/17
See application file for complete search history.

(56) References Cited

U.S. PATENT DOCUMENTS

| | | | | |
|---|---|---|---|---|
| 7,095,865 | B2 * | 8/2006 | Katayama et al. | 381/309 |
| 7,209,564 | B2 * | 4/2007 | Jin et al. | 381/17 |
| 7,542,574 | B2 * | 6/2009 | Jin et al. | 381/17 |
| 7,664,272 | B2 * | 2/2010 | Terai et al. | 381/17 |
| 7,949,141 | B2 * | 5/2011 | Reilly et al. | 381/63 |
| 2003/0138107 | A1 * | 7/2003 | Jin et al. | 381/17 |
| 2005/0117771 | A1 * | 6/2005 | Vosburgh et al. | 381/376 |
| 2008/0137870 | A1 * | 6/2008 | Nicol et al. | 381/17 |
| 2009/0030552 | A1 * | 1/2009 | Nakadai et al. | 700/258 |

FOREIGN PATENT DOCUMENTS

FR 2 880 755 A 7/2006

OTHER PUBLICATIONS

Martens, W. L. (2003). "Perceptual evaluation of filters controlling source direction: Customized and generalized HRTFs for binaural synthesis," Acoust. Sci. & Tech. 24, 220-232.*

(Continued)

*Primary Examiner* — Mary C Jacob
*Assistant Examiner* — Aniss Chad
(74) *Attorney, Agent, or Firm* — Drinker Biddle & Reath LLP

(57) ABSTRACT

The invention relates to a method for determining transfer functions of the HRTF type for an individual, that includes: measuring, for a first number of directions, the transfer functions of the HRTF type specific to the individual; matching the directivity functions associated with the measured functions of the HRTF type, with reference directivity functions associated with reference transfer functions of the HRTF type, the reference functions of the HRTF type being determined for a second number of directions higher that the first number of directions and reconstructing the measured directivity functions from the reference directivity functions.

11 Claims, 1 Drawing Sheet

OTHER PUBLICATIONS

Bishop et al., "Neural Networks for Pattern Recognition, Passage," Neural Networks for Pattern Recognition, Oxford: Oxford University Press, GB, pp. 319-324 (Jan. 1, 1995).
Chen et al., "Synthesis of 3D virtual auditory space via a spatial feature extraction and regularization model," Virtual Reality Annual International Symposium, 1993 IEEE Seattle, WA, USA, Sep. 18-22, 1993, New York, NY,USA, IEEE, pp. 188-193 (Sep. 18, 1993).
Chirikjian et al., "Rotational matching problems," International Journal of Computational Intelligence and Applications, vol. 4(4), pp. 1-16 (2004).
Everson et al., "Karhunen-Loeve procedure for gappy data," Journal of the Optical Society of America, vol. 12 (8), pp. 1657-1664, retrieved from Internet website: http://camelot.mssm.edu.publications/larry/Karhunen-Loeve.pdf (Aug. 1995).
Fahn et al., "On the Clustering of Head-Related transfer Functions Used for 3-D Sound Localization," Journal of Information Science and Engineering, pp. 141-157, retrieved from internet website: http://www.iis.sinica.edu.tw/page/jise/2003/200301_08.pdf (2003).
Gardner, "Reduced-rank modeling of head-related impulse responses using subset selection," 1999 IEEE WO Rkshop on Applications of Signal Processing to Audio and Acoustics, New Paltz, NY, USA, Oct. 17-20, 1999, Piscataway, NJ, USA, IEEE, US, pp. 175-178 (Oct. 17, 1999).
Guillon et al., "Head-Related Transfer Function customization by frequency scaling and rotation shift based on a new morphological matching method," Audio Engineering Society 125th Convention, San Francisco, CA, USA, pp. 1-14, retrieved from internet website: http://www.aes.org/e-lib/browse.cfm?elib=14702 (Oct. 5, 2008).
Guillon et al., "Head-Related Transfer Function reconstruction from sparse measurements considering a priori knowledge from database analysis: a pattern recognition approach," Audio Engineering Society 125th Convention, San Francisco, CA, USA, pp. 1-16, retrieved from internet website: http://www.aes.org/e-lib/browse.cfm?elib=14761 (Oct. 5, 2008).
Kistler et al., "A Model of Head-Related Transfer Functions Based on Principal Components Analysis and Minimum-Phase Reconstruction," Journal of the Acoustical Society of America, AIP/Acoustical Society of America, Melville, NY, US, vol. 91 (3), pp. 1637-1647 (Mar. 1, 1992).
Kostelec et al., "FFTs on the Rotation Group," Santa Fe Institute Working Papers Series, pp. 1-27 (Dec. 3, 2003).
Lemaire et al., "Individualized HRTFs From Few Measurements: a Statistical Learning Approach," 2005 IEEE International Joint Conference on Neural Networks, 2005, Proceedings, Montreal, Quebec, Canada, Jul. 31-Aug. 4, 2005, Piscataway, NJ, USA, IEEE, vol. 4, pp. 2041-2046 (Jul. 31, 2005).
MacQueen, "Some Methods for Classification and Analysis of Multivariate Observations," Proceedings of 5th Berkeley Symposium on Mathematical Statistics and Probability, pp. 281-297 (1967).
Maki et al., "Reducing individual differences in the external-ear transfer functions of the Mongolian gerbil," Journal of the Acoustical Society of America, AIP/Acoustical Society of America, Melville, NY, US, vol. 118 (4), pp. 2392-2404 (Jan. 1, 2005).
Nicol et al., "Looking for a relevant similarity criterion for HRTF clustering: a comparative study," AES 120th Convention, Paris, France, pp. 1-14, retrieved from internet website: http://www.aes.org/e-lib/inst/download.cfm.13457.pdf?ID-13457 (May 23, 2006).
Press, "Numerical Recipes in C: the Art of Scientific Computing," ed. C.U. Press, Cambridge, pp. 59-71 (1992).
Shimada et al., "A Clustering Method for Sound Localization Transfer Functions," Journal of the Audio Engineering Society, Audio Engineering Society, New York, NY, US, vol. 42 (7/08), pp. 577-583 (Jul. 1, 1994).
Von Luxburg, "A Tutorial on Spectral Clustering," Statistics and Computing, vol. 17(4), pp. 395-416 (2007).
Wahba, "Spline Interpolation and Smoothing on the Sphere," SIAM J. Sci. Stat. Comp., vol. 2(1), pp. 5-14 (Mar. 1981).
Wu et al., "Neural network model of binaural hearing based on spatial feature extraction of the head related transfer function," Proceedings of the 20th Annual International Conference of the Engineering in Medicine and Biology Society, 1998, IEEE Hong Kong, China, Oct. 29-Nov. 1, 1998, Piscataway, NJ, USA, IEEE, US, vol. 3, pp. 1109-1112 (Oct. 29, 1998).
Zhang et al., "A Spatial Hearing Model Based on Reconstruction from Wavelet Transform Modulus Maxima,"2006 IEEE International Conference on Acoustics, Speech and Signal Processing, 2006, ICASSP 2006 Proceedings, Toulouse, France, May 14-19, 2006, Piscataway, NJ, USA, IEEE, pp. V-V (Jan. 1, 2006).

* cited by examiner

METHOD AND DEVICE FOR DETERMINING TRANSFER FUNCTIONS OF THE HRTF TYPE

CROSS-REFERENCE TO RELATED APPLICATIONS

This application is the U.S. national phase of the International Patent Application No. PCT/FR2009/050246 filed Feb. 17, 2009, which claims the benefit of French Application No. 08 51348 filed Feb. 29, 2008, the entire content of which is incorporated herein by reference.

FIELD OF THE INVENTION

The present invention relates to transfer functions specific to each individual and defining the spatial hearing characteristics of that individual in particular taking account of the reflections related to his or her morphology. These functions are conventionally called HRTF (Head Related Transfer Function) functions.

The invention in particular applies to the field of telecommunication services offering spatialized sound restitution, such as for example in the case of an audio conference between several speakers, broadcasting of cinema trailers or broadcasting of any type of multi-channel audio content. The invention also applies in the case of telecommunication terminals, in particular mobile ones, for which sound rendering with a stereophonic headset allowing the listener to position the sound sources in space is envisaged.

BACKGROUND

One technique using HRTF transfer functions is binaural synthesis. Binaural synthesis is based on the use of so-called "binaural" filters, which reproduce the acoustic transfer functions between the sound source or sources and the ears of the listener. These filters serve to simulate hearing location indices which allow a listener to locate the sound in a real listening situation.

The techniques using binaural synthesis are therefore based on a pair of binaural signals which feed a restitution system. These two binaural signals can be obtained by processing the signal, by filtering a monophonic signal with the binaural filters which reproduce the acoustic propagation properties between the source placed in a given position and the two ears of a listener.

Such binaural synthesis can be used for different restitutions such as for example restitution using a headset with two earphones, or two loud speakers. The objective is the reconstruction of a sound field at the level of a listener's ears which is practically identical to that which would be induced by the real sources in space.

Binaural filters take account of all of the acoustic phenomena which modify the acoustic wave on its path between the source and the listener's ears. These phenomena include in particular the diffraction by the head and the reflections on the auricle and the upper part of the torso.

These acoustic phenomena vary according to the position of the sound source with respect to the listener and these variations make it possible for the listener to locate the source in space. In fact, these variations determine a kind of acoustic encoding of the position of the source. The hearing system of an individual system knows, by learning, how to interpret this encoding in order to locate the sound sources. However, the acoustic phenomena of diffraction/reflection depend greatly on the morphology of the individual. Quality binaural synthesis is therefore based on binaural filters which reproduce as best as possible the acoustic encoding that the listener's body produces naturally, taking account of the individual distinctiveness of his or her morphology. When these conditions are not complied with, a degradation of the binaural rendering performance is observed, which results, in particular, in an intracranial perception of the sources and confusions between the front and back locations.

Thus, these filters represent the acoustic or HRTF transfer functions which model the transformations, generated by the listener's torso, head and auricle, of the signal originating from a sound source.

Each sound source position is associated with a pair of HRTF functions, one for each ear. Moreover, these HRTF transfer functions bear the acoustic imprint of the morphology of the individual upon whom they were measured.

Conventionally, the HRTF transfer functions are obtained during a measurement phase. Initially a selection of directions which more or less finely covers the whole of the space surrounding the listener is fixed. The left and right HRTFs are measured for each direction using microphones inserted in the entrance of the listener's auditory canal. In general, a sphere centred on the listener is thus defined.

For a measurement of good quality, the measurement must be carried out in an anechoic chamber, or "dead room", such that only the acoustic reflections and phenomena related to the listener are taken into account. Finally, if N directions are measured, there is obtained, for a given listener, a database of 2N HRTF transfer functions representing, for each ear, each of the positions of the sources.

These techniques therefore require making measurements on the listener. The duration of this measuring operation is very significant because it is necessary to measure a large number of directions.

It is therefore desirable to reduce the number of measurements specific to a listener whilst retaining good modelling quality.

Statistical learning techniques address this problem. This is the case of the technique described in the patent document FR 0500218. However, statistical learning systems are difficult to adjust and to improve because the link between the parameters of the learning algorithm and their impact on the HRFT transfer functions is difficult to comprehend.

SUMMARY

In this context, a subject of the present invention is to provide HRTF transfer functions specific to a listener by carrying out a reduced number of measurements for that listener and exceeding the limits of statistical learning models.

For this purpose, the present invention relates to a method of determining

HRTF transfer functions for an individual comprising a measurement, for a first number of directions, of HRTF transfer functions specific to said individual, a matching of directivity functions associated with said measured HRTF functions with reference directivity functions associated with reference HRTF functions, said reference HRTF functions being determined for a second number of directions higher than said first number of directions and a reconstruction of the measured directivity functions from said reference directivity functions.

Consequently, the reconstructed HRTF transfer functions associated with the reconstructed directivity functions are expressed over a larger number of directions than the measured transfer functions.

In a particular embodiment, the method comprises a preliminary phase comprising a determination of said reference HRTF transfer functions for a plurality of individuals, according to a plurality of frequencies and said second number of directions, an evaluation of a spatial similarity between directivity functions associated with said reference HRTF functions, a classification of said directivity functions into groups according to their similarities, a selection of a representative directivity function for each group, and a modification of the directivity functions in order to minimize a spatial shift with respect to their respective representative directivity functions and to form the reference directivity functions.

Such an embodiment makes it possible to take account of the spatial characteristics of the directivity functions.

In a particular embodiment, said evaluation of similarity between the directivity functions is based on a similarity criterion representative of independent similarities with respect to rotational shifts of said directivity functions.

This makes it possible to take advantage of the physical characteristics of auricles whose directivity functions can be approximately similar to rotation factors.

Advantageously, said matching comprises an evaluation of a spatial similarity between the measured directivity functions and the directivity functions representative of the groups of reference directivity functions, an association of the measured directivity functions with the groups of reference directivity functions according to said evaluation of similarity, a modification of the measured directivity functions in order to minimize a spatial shift with respect to the representative directivity functions of the associated groups.

Thus matched, the measured directivity functions can more easily be expressed according to the reference directivity functions.

In such an embodiment, the method comprises moreover a modification of the measured directivity functions after said reconstruction in order to at least partially compensate for the minimization of the spatial shift.

In a particular embodiment, said reconstruction of the measured directivity functions comprises a determination of reconstruction directivity functions among the reference directivity functions of the group associated with the current measured directivity function, a determination of a base of reconstruction vectors from said reconstruction directivity functions and an expression of said current measured directivity function on said base of reconstruction vectors.

Thus, the measured directivity functions are reconstructed on a suitable base of vectors corresponding to reference directivity functions.

Advantageously, the determination of the reconstruction directivity functions comprises an interpolation from the reference directivity functions at least for the directions of the measured directivity functions.

Such an embodiment makes it possible to ensure vector matching between the measured directivity functions and the reconstruction directivity functions.

In a particular embodiment, said expression of the measured directivity functions on said base of reconstruction vectors comprises an approximation based on information coming from said reconstruction directivity functions and from information coming from said measured directivity functions.

In such an embodiment, the method comprises moreover a modification of the reconstructed directivity functions in order to at least partially compensate said approximation.

In a corresponding manner, the invention relates to a corresponding device and a computer program, characterized in that it comprises code instructions for the implementation of the previously described method, when it is executed by a calculator of that computer.

BRIEF DESCRIPTION OF THE DRAWINGS

The present invention will be better understood in the light of the description and of the attached figures in which.

DETAILED DESCRIPTION

Figure 1A:
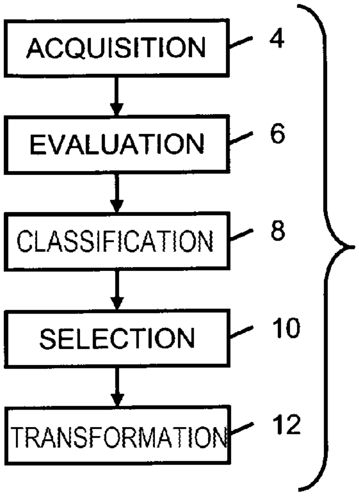
FIGS. 1A and 1B show flowcharts of the method according to an embodiment of the invention.

A method according to an embodiment of the invention will now be described with reference to FIGS. 1 A and 1B.

This method begins with a preliminary phase 2 of determination of a database of reference HRTF functions. This preliminary phase comprises an acquisition 4 of HRTF transfer functions for a plurality P of individuals according to a plurality M of frequencies and a plurality N of directions. For example, the measurements relate to several hundred individuals each having been the subject of measurements over a thousand or so directions in the audible frequency band. This database can be constituted by non-homogeneous measurements, i.e. carried out in different environments at different times.

In the continuation of the method the directivity characteristics of the HRTF transfer functions are used. This amounts to considering the HRTF transfer functions in the form of directivity functions. Each directivity function represents the modulus of an HRTF transfer function for given a frequency and evaluated over the N points in space. The method therefore has the availability of 2*P*M directivity functions. As the directivity functions are directly extracted from the HRTF functions, no specific step is required at this level.

A spatial similarity of the directivity functions is then evaluated in a step 6. This evaluation is carried out by a comparison of the directivity functions two at a time independently of their frequency. The results form a symmetric similarity matrix of size (2*P*M)×(2*P*M).

In the described embodiment, the measurement of similarity is the maximum of the spherical inter-correlation normalized over $R \in SO(3)$. The normalized spherical inter-correlation is defined as an approximate rotation R.

Considering f and g to be two directivity functions, respectively centred on their mean over the whole sphere, the functions f and g are of limited band B, and are such that $f, g \in L^2(S^2)$. The normalized spherical inter-correlation $C_R(f,g)$ between f and g, for a given rotation $\Lambda_R$ of the function g is expressed as follows:

$$C_R(f, g) = \frac{\int_\Omega f \cdot \overline{\Lambda_R(g)} \cdot d\omega}{\sqrt{\int_\Omega f \cdot \overline{f} \cdot d\omega \cdot \int_\Omega g \cdot \overline{g} \cdot d\omega}}$$

$R \in SO(3)$ and $\Lambda_R: L^2(S^2) \to L^2(S^2)$ is such that $$\Lambda_R(f)(\omega) = f(R^{-1}(\omega))$$

f and g can be expressed according to their decomposition to spherical harmonics:

$$f(\omega) = \sum_{l=0}^{B-1} \sum_{|m| \le l} \hat{f}_l^m Y_l^m(\omega),$$

$$g(\omega) = \sum_{l=0}^{B-1} \sum_{|m| \le l} \hat{g}_l^m Y_m^l(\omega)$$

The normalized spherical inter-correlation is therefore:

$$C_R(f,g) = \frac{\sum_{l=0}^{B-1} \sum_{|m|\leq l} \sum_{m'\leq l} \hat{f}_l^{-m} \overline{\hat{g}_l^{-m'}} (-1)^{m-m'} D_{m,m'}^l(R)}{\sqrt{\sum_{l=0}^{B-1} \sum_{m\leq l} \hat{f}_l^m \overline{\hat{f}_l^m}} \sqrt{\sum_{l=0}^{B-1} \sum_{m\leq l} \hat{g}_l^m \overline{\hat{g}_l^m}}}$$

In this expression $D_{m,m'}^l(R)$ is a function called the Wigner-D function as described for example in the Kostelec, P J. and D. N. Rockmore, document "*FFTs on the Rotation Group*", Santa Fe Institute Working Papers Series, 2003.

The denominator is calculated directly and the numerator is expressed as an inverse Fourier transform on the SO(3) group as defined in the previously mentioned document. The implementation of this calculation can therefore be carried out without difficulty using fast FFT algorithms. Consequently, this calculation and the discrete sampling of the rotations can be carried out rapidly.

The evaluation of the similarities 6 is followed by a classification 8 in order to form K groups or clusters of directivity functions according to their similarities. Various classification algorithms can be used for carrying out this step.

In the embodiment described, the classification is a spectral classification such as that described in the document by Von Luxburg, U., "A Tutorial on Spectral Clustering. Statistics and Computing" 2007 17(4) p. 395-416. The directivity functions are considered as nodes of a graph which has to be partitioned. Each edge of this graph is weighted by the value of the similarity between its ends. The matrix expressing the laplacian of the graph is decomposed to eigenvalues, and the K groups are obtained by a classification algorithm such as the algorithm called "k-means" applied in the representation space that the first K eigenvalues of the laplacian constitute. An example of a so-called k-means algorithm is described in the document by MacQueen, J. B. "Some methods for classification and analysis of multivariate observations" in Proceedings of 5th Berkeley Symposium on Mathematical Statistics and Probability 1967.

The classification is followed by a selection 10, for each group, of a representative directivity function. For example, the representative function of a group is the directivity function whose average similarity with the other directivity functions of the group is the greatest. In a variant, the representative function is the directivity function which exhibits the lowest Euclidian distance with the other functions of the group. Other selection principles can be used.

Finally, the preliminary phase 2 comprises a modification or transformation 12 of the directivity functions in order to minimize a spatial shift between the directivity functions of the groups and the corresponding representative functions.

In the described embodiment, this minimization is a spatial rotation applied to each directivity function in order to maximize its similarity with the representative function of the corresponding group. This operation makes it possible to reduce the spatial differences of the directivity functions, these differences resulting from a different orientation of auricles which are otherwise structurally alike.

More precisely, a first estimation of the optimal rotation $R_0$ of alignment is the rotation R which maximises the normalized spherical inter-correlation described with reference to step 6. Advantageously, the estimation of R is improved in the case where the calculation of this rotation R by IFFT on SO(3) is carried out only on a limited sampling of the group or rotations SO(3). The minimization is then improved by exploring the space SO(3) according to a gradient descent algorithm, such as that proposed in the document by Chirikjian, G. S., et al. "Rotational matching problems" International Journal of Computational Intelligence and Applications, 2004. 4(4): p. 401-416.

The rotation is initialized and the algorithm converges towards an optimal solution by minimizing the cost function equal to the opposite of the normalized spherical inter-correlation.

After the preliminary phase 2, the method therefore has the availability of reference directivity functions which are grouped in groups corresponding to auricles which are structurally similar.

An operational phase of the method of the invention will now be described with reference to FIG. 1B.

This phase comprises a measurement or acquisition 14 of HRTF transfer functions specific to a listener. These acoustic or HRTF transfer functions are measured according to the conventional methods for a plurality n of directions and a plurality M' of frequencies. The number of directions n is less than the number of directions N measured during the acquisition 4. For example, the number of directions in the measurement 14 is ten times less than the number of directions in the acquisition 4.

As during the preliminary phase, the method uses measured directivity functions associated with the measured HRTF transfer functions. These directivity functions are extracted directly from the measured HRTF transfer functions without requiring a special step. The method thus has the availability of 2*M' measured directivity functions.

The method then comprises a matching 20 between the measured directivity functions and the reference directivity functions.

This matching begins with an evaluation 22 of the similarities between the measured directivity functions and the representative directivity functions of the groups of reference directivity functions.

As for the evaluation 6, the evaluation 22 comprises a comparison, two at a time and independently of the frequency of the measured directivity functions and of the representative directivity functions of the groups. In the described embodiment, this comparison is based on the same measurement of similarity as the comparison of step 6.

The evaluation 22 is followed of an association 24 of the measured directivity functions with the groups of reference directivity functions. More precisely, each measured directivity function is associated with the group from which originates the representative function with which the evaluation of similarity is maximal.

This step is similar to a recognition of forms between the set, or the constellation, of the measured directivity functions and reference directivity functions.

Finally, the matching 20 comprises a modification 26 of the measured directivity functions in order to minimize a spatial shift with the associated representative directivity functions. Thus, each measured directivity function is modified to make it possible to increase its similarity with the representative directivity function which is associated with it. This modification 26 is similar to the modification 12 described previously.

Then, the method comprises a reconstruction 30 of the measured directivity functions from the reference directivity functions. This reconstruction begins with a determination 32 of reconstruction directivity functions. These reconstruction directivity functions are determined, for a measured directivity function, from the group of reference directivity functions associated with this measured directivity function. Moreover, the number of directions on which the reconstruction directivity functions are determined corresponds with the desired level of precision. In any case, this number must be higher than n, the number of directions measured.

In the described embodiment, this determination firstly comprises an interpolation from the reference directivity functions. In fact, except in special cases, the reference directivity functions are not known exactly in the directions of the measured directivity functions.

Consequently, for the current measured directivity function, the reconstruction directivity functions are determined by interpolation from the reference directivity functions of the associated group.

In general, the sampling of the spatial environment obtained by the reference directivity functions is refined and re-sampled to include the measurement directions and to ensure vector correspondence between the measured directivity functions and the reconstruction directivity functions.

The reconstruction directivity functions are thus obtained for the n directions of the current measured directivity function.

Step 32 then comprises the determination of the reconstruction directivity functions for N' additional directions in order to achieve the desired level of precision.

In the described embodiment, the reconstruction directivity functions are also determined for the N' additional directions by interpolation from the reference directivity functions of the group associated with the measured directivity function. The objective of this interpolation is to obtain a homogeneous spatial distribution of the reconstruction directivity functions. For example, the additional directions are selected by triangulation in space from the measured directions.

It is of course also possible to select the additional directions directly from the directions of determination of reference directivity functions.

Finally, the reconstruction directivity functions are determined for n+N' directions for each measured directivity function.

In a step 34 the reconstruction directivity functions are expressed in the form of a base of reconstruction vectors.

In the described embodiment, this step 34 is a principal components analysis (PCA). For this purpose, each reconstruction directivity function of a group is represented as a vector $v_i$ of which each dimension is associated with a position on the sphere, and of which each component is the value taken by this directivity function in these positions. These data are centred about the arithmetic mean of the set of observations:

$$x_i = v_i - \overline{v_i},$$

where $$\overline{v_i} = \frac{1}{m}\sum_{i=1}^{m} v_i \underline{m}$$

being the number of elements of the group.

The data are then concatenated, in order to form a matrix X:

$$X = (x_1, x_2, \ldots, x_m).$$

By defining the covariance matrix $$C = \frac{1}{m} XX^T,$$

the PCA is then based on a diagonalization of C:

$$C = S \cdot \mathrm{diag}(\sigma_i^2) \cdot S^T.$$

The appropriate base of vectors for the reconstruction $S \cdot \mathrm{diag}(\sigma_i)$ is extracted from this matrix.

In practice, this step can be carried out via a decomposition to singular values of the matrix X such as described in the document by Press, W. H., et al., "Numerical recipes in C: the art of scientific computing", published by C.U. Press, 1992, Cambridge.

The rank of the matrix C being at most equal to m−1, then $\sigma_m = 0$ and therefore $s_m$, the last column S has no impact at the level of the reconstruction. It is therefore possible of ignore this column.

The base of the vectors appropriate for each measured directivity function is constructed and sequenced such that the vectors express a decreasing part of the variability of the analyzed data in a hierarchical manner. Advantageously, only the first q vectors, with $q < m-1$ are retained.

Finally, the method comprises, in a step 36, an expression of the measured directivity functions on the basis of appropriate vectors associated with the group identified for the current measured function. In the described embodiment, it is a projection of each measured directivity function carried out on the dimensions common with the base of appropriate vectors.

Advantageously, the projection is regularized in order to produce a compromise between the exactitude of the reconstruction at the level of the measurement points and the plausibility of the result.

This projection is used for expressing the measured directivity functions in the form of linear combinations of the reconstruction vectors. As the vectors are defined on a higher number of directions than the measured directivity functions, the reconstructed directivity functions have a higher spatial resolution than the measured directivity functions.

In the described embodiment, the regularized projection is carried out according to a method proposed by Blanz et al in the document "Reconstructing the complete 3D shape of faces from partial information". it+ti, Informationstechnik and Technische Informatik, 2002. 44(6). According to this formulation, called "Bayesian", the result is sure to be a compromise between probability of the result and precise reconstruction at the measurement points, and this is by means of adjusting a single parameter.

Let L be the matrix of dimension (n)×(n+N'): L is formed by concatenation of the identity matrix of dimension (n)×(n) with the zero matrix of dimension (n)×(N').

$Q = LS \cdot \mathrm{diag}(\sigma_i)$ is defined, and $Q = UVW^T$ is its decomposition to singular values.

Let $r_{low}$ be the vector of dimension n, of which the components are the values of the measured directivity function at the n points of the sphere. According to the algorithms proposed by Blanz et al, the solution which maximizes the probability of the high resolution reconstruction $r_{high}$ is written:

$$r_{high} = S\mathrm{diag}(\sigma_i) V \mathrm{diag}\left(\frac{w_i}{w_i^2 + \eta}\right) U^T (r_{low} - L\overline{v}) + \overline{v}$$

In this expression $W = \mathrm{diag}(w_i)$ is the regularization factor which makes it possible to adjust the compromise between reconstruction faithful to the n measured points and a posteriori probability of the solution.

The method then comprises a step 40 of modification of the reconstructed directivity functions. This step applies a modification that is the inverse of the modification of step 26 and makes it possible to cancel the effects of the rotations previously applied in order to minimize a spatial shift between the measured directivity functions and the directivity functions representative of the groups of reference directivity functions.

Advantageously, the method also comprises a correction 42 of the compromise made during the projection in step 36. In the described embodiment, a reconstruction error is evaluated at the measurement points by comparing the measured directivity functions and the reconstructed functions for these points. This error is then removed. Advantageously, the reconstruction error can also be evaluated for additional directions at the measurement points. By way of example, this evaluation can be carried out by interpolation according to the algorithms described in the publication by Wahba, G., "Spline interpolation and smoothing on the sphere." SIAM J. Sci. Stat. Comp., 1981.2: p. 5-14.

The reconstructed HRTF transfer functions are obtained directly using the coefficients of the reconstructed directivity functions. As previously indicated, the directivity functions correspond to a particular reading of the values of HRTF transfer functions. The reconstruction of the directivity functions therefore automatically results in the reconstruction of the HRTF transfer functions.

Thus, the method of the invention makes it possible to reconstruct the HRTF transfer functions specific to an individual with a fine spatial resolution from HRTF transfer functions measured using a coarse sampling of directions. This allows a simplification and a reduction of the constraints of the procedure of acquisition of HRTF transfer functions specific to a listener.

Moreover, in comparison with statistical learning models, information coming from physical phenomena and the spatial structure of the HRTF transfer functions are taken into account.

Finally, the individualization parameters of the model are HRTF transfer functions measured on the individual and constituent parameters that are more reliable than morphological parameters.

Figure 2:
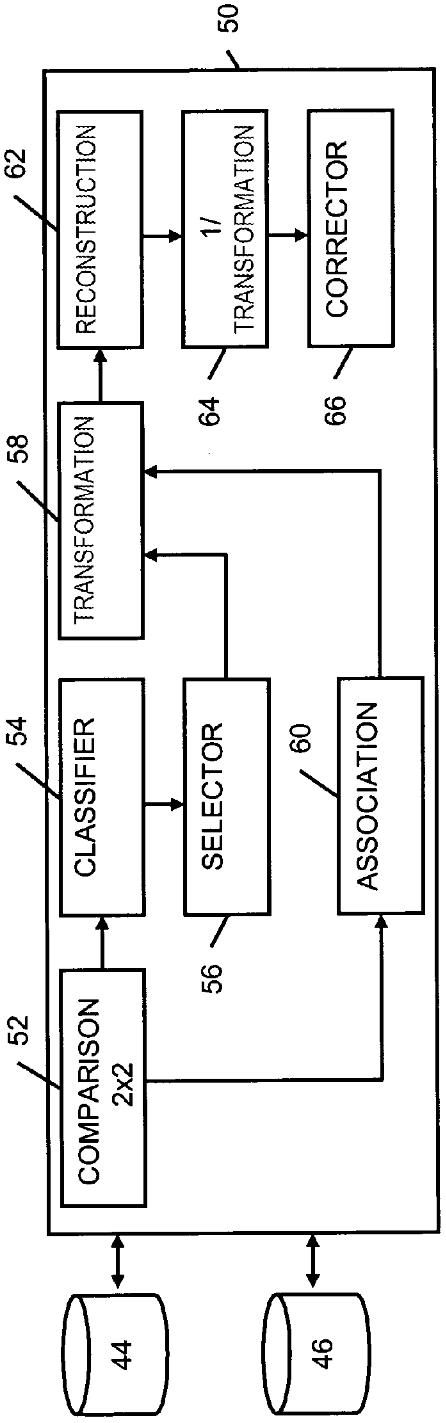
FIG. 2 shows a block diagram of a system implementing the invention.

A device for the implementation of the invention will now be described with reference to FIG. 2.

In the described embodiment, the device is adapted to implement the preliminary and operational phases. It is connected to a data base 44 of reference HRTF functions and to a database 46 of functions of measured HRTF functions. Moreover, in the described embodiment, these databases are directly modified during the operation of the device.

Figure 1B:
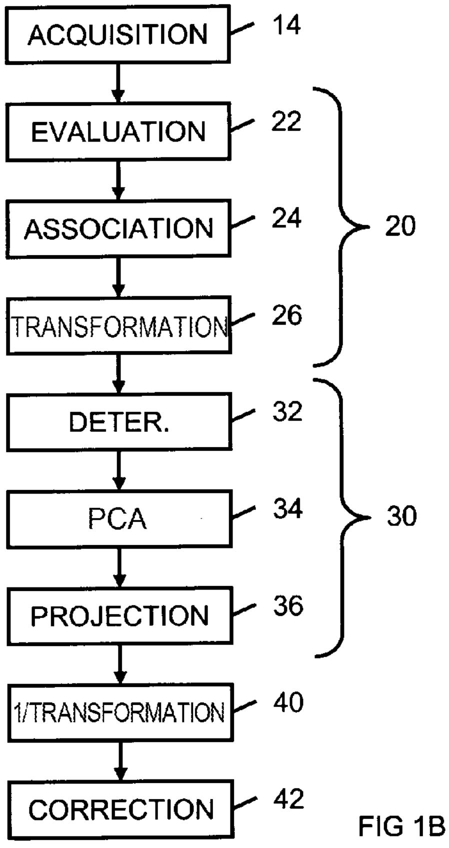

The device 50 comprises at its input a module 52 for evaluation of similarities adapted for carrying out the comparisons of the directivity functions as described in steps 6 and 14 with reference to FIGS. 1A and 1B.

The output of the module 52 is connected to a classifier 54 adapted for implementing the step 8 of classification of the reference directivity functions into groups according to their similarities.

The module 54 is connected to a selector 56 capable of carrying out the selection 10 of representative directivity functions of the groups of reference directivity functions.

Finally, the selector 56 is connected to a transformation module 58 capable of carrying out an operation of minimization of a spatial shift and therefore capable of implementing step 12. Advantageously, this same module 58 is also capable of implementing step 26.

Moreover, the comparison module 52 is also connected to an association module 60 which is adapted to implement step 24 described with reference to FIG. 1B. The output of this module 60 is connected to the transformation module 58.

Consequently, modules 52 to 58 make it possible to implement the steps 2 and 20 of the method as described previously with reference to FIGS. 1A and 1B.

Moreover, the device 60 also comprises a module 62 able to carry out the reconstruction operations of step 30 as described with reference to FIG. 1B.

The output of this module 62 is connected to a module 64 performing the transformation that is the inverse of the transformation of module 58 in order to implement step 40 of the method of the invention.

Advantageously, the device 50 also comprises a corrector 66 implementing step 42.

The elements necessary for carrying out the preliminary phase 2 and the operational phase can of course be separate. Moreover, the operations of evaluation of the similarities and of transformation can be different in the preliminary and operational phases, requiring separate elements for their implementation.

In the described embodiment, the different elements described are computer programs or sub-programs comprising code instructions for the implementation of the method as described previously when these instructions are executed by the calculator of a computer.

The invention claimed is:

1. A computer-implemented method for determining head related transfer functions (HRTFs) for an individual comprising:

measuring, for a first number of directions, HRTFs specific to said individual;

extracting measured directivity functions from said measured HRTFs for said individual;

evaluating, using a computer, spatial similarities between the measured directivity functions and representative directivity functions of groups of reference directivity functions;

associating a measured directivity function with a group of reference directivity functions, wherein the measured directivity function is associated with the group from which originates the representative function with which the evaluation of the spatial similarity is maximal;

determining, for the measured directivity function, a reconstruction directivity function by interpolating from a reference directivity function of the associated group;

determining reconstruction directivity functions for additional directions by interpolating from reference directivity functions of the associated group; and obtaining HRTFs for said individual for a second number of directions greater than the first number of directions from the reconstructed directivity functions.

2. The method according to claim 1, wherein the method further comprises a preliminary phase comprising:

determining reference HRTFs for a plurality of individuals, according to a plurality of frequencies and said second number of directions;

evaluating spatial similarities between directivity functions associated with said reference HRTFs;

classifying said directivity functions into groups according to their spatial similarities;

selecting a representative directivity function for each group; and modifying the directivity functions in order to minimize a spatial shift with respect to their respective representative directivity functions and to form the reference directivity functions.

3. The method according to claim 2, wherein said evaluation of similarities between the directivity functions is based on a similarity criterion representative of independent similarities with respect to rotational shifts of said directivity functions.

4. The method according to claim 2, wherein said associating comprises:

evaluating spatial similarities between the measured directivity functions and the representative directivity functions of the groups of reference directivity functions;

associating the measured directivity functions with the groups of reference directivity functions according to said evaluation of similarities; and modifying the measured directivity functions in order to minimize a spatial shift with respect to the representative directivity functions of the associated groups.

5. The method according to claim 4, further comprising modifying the measured directivity functions, after said determining reconstruction directivity functions for additional directions, in order to at least partially compensate for the minimization of the spatial shift.

6. The method according to claim 2, wherein said modifying of the measured directivity functions comprises:

determining reconstruction directivity functions among the reference directivity functions of the group associated with the measured directivity function;

determining a base of reconstruction vectors from said reconstruction directivity functions; and expressing said measured directivity function on said base of reconstruction vectors.

7. The method according to claim 6, wherein the determination of the reconstruction directivity functions among the reference directivity functions comprises interpolating from the reference directivity functions at least for the directions of the measured directivity functions.

8. The method according to claim 7, wherein said expression of the measured directivity functions on said base of reconstruction vectors comprises approximating based on information coming from said reconstruction directivity functions and from information coming from said measured directivity functions.

9. The method according to claim 8, further comprising modifying the reconstructed directivity functions in order to at least partially compensate said approximation.

10. A non-transitory computer readable medium storing a computer program for the determination of head related transfer functions (HRTFs) for an individual, comprising code instructions which, when they are executed by a calculator of that computer, result in the performance of the steps of the method according to claim 1.

11. A device for the determination of head related transfer functions (HRTFs) for an individual comprising:

a computer including an input module, a classifier, a selector, and a transformation module, wherein the input module, the classifier, the selector, and the transformation module are adapted to:

evaluate, using the computer, spatial similarities between measured directivity functions and representative directivity functions of groups of reference directivity functions, and associate a measured directivity function with a group of reference directivity functions, wherein the measured directivity function is associated with the group from which originates the representative function with which the evaluation of spatial similarity is maximal; and the device further comprising a module adapted to:

determine a reconstruction directivity function by interpolating from a reference directivity function of the associated group, and determine reconstruction directivity functions for additional directions by interpolating from reference directivity functions of the associated group.

* * * * *